(12) United States Patent
Bychkov et al.

(10) Patent No.: US 9,230,389 B2
(45) Date of Patent: Jan. 5, 2016

(54) AUTOMATED CARD CUSTOMIZATION MACHINE

(75) Inventors: Eyal Bychkov, Hod Hasharon (IL); Yohan Cohen, Hod Hasharon (IL); Itzhak Pomerantz, Kefar Saba (IL); Avraham Meir, Rishon Lezion (IL)

(73) Assignee: SANDISK IL LTD., Kfar Saba (IL)

( * ) Notice: Subject to any disclaimer, the term of this patent is extended or adjusted under 35 U.S.C. 154(b) by 95 days.

(21) Appl. No.: 13/012,421

(22) Filed: Jan. 24, 2011

(65) Prior Publication Data

US 2011/0114738 A1    May 19, 2011

Related U.S. Application Data

(63) Continuation of application No. 11/618,939, filed on Jan. 2, 2007, now Pat. No. 7,896,241.

(60) Provisional application No. 60/755,536, filed on Jan. 3, 2006.

(51) Int. Cl.
| | |
|---|---|
| G06K 19/06 | (2006.01) |
| G07F 11/00 | (2006.01) |
| G06Q 20/12 | (2012.01) |
| G06Q 20/34 | (2012.01) |
| G07F 7/10 | (2006.01) |
| G07F 17/26 | (2006.01) |

(52) U.S. Cl.
CPC ............ *G07F 11/00* (2013.01); *G06Q 20/1235* (2013.01); *G06Q 20/3552* (2013.01); *G07F 7/1008* (2013.01); *G07F 17/26* (2013.01)

(58) Field of Classification Search
USPC ......................................................... 235/492
See application file for complete search history.

(56) References Cited

U.S. PATENT DOCUMENTS

| | | | |
|---|---|---|---|
| 5,235,519 A | 8/1993 | Miura | |
| 5,372,416 A | 12/1994 | Shapley et al. | |
| 5,465,082 A | 11/1995 | Chaco | |
| 5,753,897 A | 5/1998 | Kasper | |
| 5,837,991 A | 11/1998 | LaManna et al. | |
| 5,949,046 A * | 9/1999 | Kenneth et al. | 235/380 |
| 6,169,975 B1 | 1/2001 | White et al. | |
| 6,227,972 B1 | 5/2001 | Walker et al. | |
| 6,298,336 B1 | 10/2001 | Davis et al. | |
| 6,659,869 B1 * | 12/2003 | Akamatsu | 463/31 |
| 7,218,991 B2 | 5/2007 | Walker et al. | |
| 7,676,401 B2 | 3/2010 | Sawada et al. | |
| 2007/0192590 A1 | 8/2007 | Pomerantz et al. | |
| 2007/0215433 A1 * | 9/2007 | Logan et al. | 194/209 |

OTHER PUBLICATIONS

Non-Final Office Action for U.S. Appl. No. 11/618,939 mailed Jan. 7, 2008, 15 pages.
Final Office Action for U.S. Appl. No. 11/618,939 mailed May 13, 2008, 16 pages.
Advisory Action for U.S. Appl. No. 11/618,939 mailed Aug. 27, 2008, 3 pages.

(Continued)

*Primary Examiner* — Rafferty Kelly
(74) *Attorney, Agent, or Firm* — Toler Law Group, PC

(57) ABSTRACT

A memory card includes a non-volatile memory, a connector configured to enable the memory card to be operatively coupled to a host computer, and a housing enclosing the non-volatile memory. The housing has a customized physical contour that is determined according to a user-selected value.

24 Claims, 2 Drawing Sheets

(56) References Cited

OTHER PUBLICATIONS

Non-Final Office Action for U.S. Appl. No. 11/618,939 mailed Oct. 29, 2008, 17 pages.
Final Office Action for U.S. Appl. No. 11/618,939 mailed Apr. 7, 2009, 14 pages.
Non-Final Office Action for U.S. Appl. No. 11/618,939 mailed Sep. 18, 2009, 14 pages.
Final Office Action for U.S. Appl. No. 11/618,939 mailed Apr. 8, 2010, 13 pages.
Notice of Allowance and Fees Due for U.S. Appl. No. 11/618,939 mailed Oct. 25, 2010, 5 pages.
Supplemental Notice of Allowability for U.S. Appl. No. 11/618,939 mailed Nov. 24, 2010, 7 pages.
Supplemental Notice of Allowability for U.S. Appl. No. 11/618,939 mailed Dec. 17, 2010, 6 pages.

\* cited by examiner

AUTOMATED CARD CUSTOMIZATION MACHINE

CLAIM OF PRIORITY

This continuation patent application claims priority from U.S. patent application Ser. No. 11/618,939 filed Jan. 2, 2007, which claims the benefit from U.S. Provisional Patent Application No. 60/755,536 filed Jan. 3, 2006. The contents of each of these applications are incorporated by reference herein in their entirety.

FIELD OF THE DISCLOSURE

The present invention relates generally to the field of card customization.

BACKGROUND

Memory cards having a digital circuit and a read-write memory are well known in the art of digital storage devices, and are used for many applications such as driver licenses, credit cards, employee badges, membership cards etc.

Some of these cards, such as smart cards, are used as a bearer of identification or financial transactions providing their bearer security services, such as access to information or to money. These cards have to be secured against fraud, theft and loss. Therefore, organizations that issue these cards take several measures of security to prevent cards from reaching wrong hands.

Automatic vending machines for automatically vending different types of products that were once retailed only over the counter are very well known in the art of commerce. Typical examples are vending machines that deliver cash money, plane tickets, cellular phones, telephone cards, personal photographs etc.

Vending machines that require access to secure content of a user for completing the operation, such as automatic teller machines (ATM) machines, must be secure, fortified and monitored, making such vending machines very heavy and expensive.

Because of the alienation, competition and suspicion between the different issuers of secure memory cards of all sorts, issuers of different digital storage cards are reluctant to cooperate when it comes to sharing a common vending machine for digital storage cards. A Secure memory card, such as a SIM (Subscriber Identification Mobile) card is a smart-card-type device storing secured data (e.g. private key for identification of a user). ATM machines are an exception as different banks share the same vending machine, but this is a case where the delivered product is a uniform and non-customized product, such as bills of money, and where there is no competition between the vendors, as each user consumes cash from his/her own bank account.

There is thus a widely recognized need for, and it would be highly advantageous to have a solution by which several card issuers could serve their customers with enhanced and more economic services, which are not provided by solutions known in the art.

SUMMARY

Accordingly, it is a principal object of the present invention to introduce a card vending machine that issues digital memory cards of several types in compliance with the specific requirements of each of a plurality of different and unrelated issuers.

By "issuers" it refers herein in the broad sense to any human agent authorized to represent a specific commercial organization.

A card vending machine is defined here as a machine operative to customize and retail digital memory cards. Accordingly, "vending" refers to the retail sale and/or customization of digital memory cards, as performed, for example, by the card vending machine of the present invention.

The term "customize" is referred herein to mean at least one of programming at least 200 bytes of user-dependent data and/or changing (e.g. printing, shaping) the visual appearance of the digital memory card, operations of which are applied by the card vending machine of the present invention, to modify the visual appearance and data storage of a digital memory card in accordance with the user's preferences and the issuer's policy.

In accordance with a preferred embodiment, there is provided a card vending machine that includes: (a) a storage area, wherein each of a plurality of memory cards to be issued by a respective one of at least two different issuers are stored.

Preferably, the card vending machine also includes a security mechanism that conditions access of each of the different issuers to only a respective portion of the storage area upon authorization of the issuers. More preferably, the security mechanism includes compartments, within the storage area, each compartment having a corresponding locking mechanism that provides access to only an authorized issuer.

Preferably, the plurality of memory cards includes secure memory cards.

Preferably, the card vending machine also includes an interface mechanism that is operated by a user to define a purchasing transaction and a controller that is operative, in accordance with the interface mechanism, to customize a memory card at least in part according to the purchasing transaction.

Optionally, the memory card is one of a plurality of memory cards. Alternatively, the memory card is a personal memory card that is fed to the card vending machine by the user. More alternatively, the card vending machine also includes a card slot for inputting the personal memory card.

More preferably, the controller is operative to customize the memory card in accordance with a value of at least one feature, such as digital content, physical contour, graphical decoration, means of payment, etc. Also more preferably, the card vending machine includes an authentication mechanism for authentication of the user in accordance with requirements of a respective issuer of the memory card. Most preferably, the controller is operative to customize the memory card conditional on the authentication of the user.

The authentication mechanism may include a biometric identifier reader, a voice recognition unit (such as a microphone), a facial recognition unit (such as a camera), a wireless communication mechanism, and/or any other authorization means known in the art.

The interface mechanism may include a keypad, a touch screen, a USB connector, a scanner, etc.

Also more preferably, the card vending machine may include a contour shape editor unit that is responsive to the controller to customize the memory card, and/or a graphical editor unit that is responsive to the controller to customize the memory card, and/or a programming unit that is responsive to the controller to program the memory card with digital content. Most preferably, the programming unit is operative to store at least 200 bytes of data (including user-dependent data) in the memory card. Also more preferably, the card vending machine includes a display for displaying a pre-view of the customized memory card.

In accordance with a preferred embodiment, there is further provided a vending method that includes the steps of: (a) storing, in a common storage area, a plurality of memory cards; and (b) issuing each of the plurality of memory cards by a respective one of at least two different issuers.

Preferably, the plurality of memory cards includes at least one secure memory card.

Preferably, the vending method also include the steps of receiving a respective value of each of at least one parameter that defines a purchasing transaction of a user; and customizing one of the memory cards, at least in part, according to at least one of these values. More preferably, the customizing step is effected in accordance with a value of at least one feature, such as digital content, physical contour, graphical decoration, means of payment, etc. Also more preferably, the customizing includes storing at least 200 bytes of data (including data-dependent data) in the memory card.

More preferably, the vending method also includes the step of previously to the customizing, authenticating a user in accordance with requirements of the respective one issuer. Most preferably, the customization of this memory card is conditional on the authentication of the user. The authentication may be effected by any authentication means known in the art, such as by reading biometric identification, by voice recognition, by facial recognition, by wireless communication, etc.

More preferably, the vending method also includes downloading digital content from a remote device in accordance with at least one of these values. Also more preferably, the vending method includes displaying a pre-view of the customized memory card. Also more preferably, the vending method includes allowing access of each the different issuers to only a respective portion of the common storage area conditional on authorization of this issuer. Most preferably, the step of allowing access includes separately storing memory cards of each issuer in compartments, each compartment having a corresponding locking mechanism that provides access to only an authorized issuer.

More preferably, the memory card is a personal memory card that is fed by the user. Most preferably, the vending method also includes updating the personal memory card.

In accordance with a preferred embodiment, there is further provided a card vending machine that includes: (a) an interface mechanism that is operated by a user to define a purchasing transaction; and (b) a controller that is operative, in accordance with the interface mechanism, to customize a memory card at least in part according to the purchasing transaction.

In accordance with a preferred embodiment, there is further provided a method of vending of memory cards by a card vending machine that includes the steps of: (a) receiving, by the card vending machine, a respective value of each of at least one parameter that defines a purchasing transaction of a user; and (b) customizing, by the card vending machine, one of the memory cards, at least in part, according to at least one of these values.

In accordance with a preferred embodiment, there is further provided a card vending machine that includes: (a) an interface mechanism that is operated by a user to define a purchasing transaction; and (b) a controller that is operative, in accordance with the interface mechanism, to customize a memory card at least in part according to the purchasing transaction by modifying at least 200 bytes of user-dependant data.

In accordance with a preferred embodiment, there is further provided a method of vending of memory cards by a card vending machine that includes the steps of: (a) receiving, by the card vending machine, a respective value of each of at least one parameter that defines a purchasing transaction of a user; and (b) customizing, by the card vending machine, one of the memory cards, at least in part, according to at least one of these values by modifying at least 200 bytes of user-dependant data.

In accordance with a preferred embodiment, there is further provided a card vending machine that includes: (a) an interface mechanism that is operated by a user to define a purchasing transaction; and (b) a controller that is operative, in accordance with the interface mechanism, to customize a visual appearance of a memory card at least in part according to the purchasing transaction.

In accordance with a preferred embodiment, there is further provided a method of vending of memory cards by a card vending machine that includes the steps of: (a) receiving, by the card vending machine, a respective value of each of at least one parameter that defines a purchasing transaction of a user; and (b) customizing, by the card vending machine, a visual appearance of one of the memory cards, at least in part, according to at least one of these values.

In accordance with a preferred embodiment, there is further provided a card vending machine that includes: (a) a connecting mechanism for receiving digital content from an external storage unit; and (b) a controller that is operative to store, in a memory card, at least a portion of the digital content.

Preferably, the controller is further operative to modify the digital content.

Preferably, the connecting mechanism includes a USB connector.

In accordance with a preferred embodiment, there is further provided a method of vending of memory cards by a card vending machine that includes the steps of: (a) receiving, by the card vending machine, digital content from an external storage unit; and (b) storing, in a memory card, at least a portion of the digital content. Preferably, the method also includes modifying, by the card vending machine, the digital content.

Additional features and advantages of the invention will become apparent from the following drawings and description.

BRIEF DESCRIPTION OF THE DRAWINGS

For a better understanding of the invention with regard to the embodiments thereof reference is made to the accompanying drawing, in which like numerals designate corresponding sections or elements throughout, and in which.

DETAILED DESCRIPTION

The present invention is a card vending machine that issues digital memory cards of several types in compliance with the specific requirements of each of a plurality of different and unrelated issuers.

The digital memory cards are printed, shaped and programmed by the card vending machine, in accordance with the user's preferences and the issuer's policy. By way of example, the user's preferences may determine the way of which the digital memory card is to be produced in accordance with a plurality of aspects, such as the digital content to be downloaded (e.g. digital book, video films, audio songs, and software applications), the physical contour, the graphical decoration, the means of payment, etc.

Typically, the digital memory cards provided by the card vending machine of the present invention include non-secure digital memory cards (such as a digital book) and secure digital memory cards (such as pre-paid cards, membership cards, etc.). Secure cards will be provided to a user upon authentication of the user, in accordance with the requirements defined by the issuer of such cards.

The digital memory cards stored in the card vending machine of the present invention can also be empty digital memory cards (that bear no content) or digital memory cards having DRM protected content.

In accordance with one embodiment, a user can use the card vending machine to purchase a new digital memory card. As an example, the user can request to purchase a new digital memory card that includes specific songs stored in a digital format and that is illustrated with a personal graphical dedication.

In accordance with one embodiment, a user can use the card vending machine to update his/her old digital memory card, for example for storing new digital content, for loading more money, etc.

Typically, the digital memory cards stored in the card vending machine are of a standard size, such as the ISO 7810 standard or the ISO 7816 standard The cards can include a flat USB connector, such as the Double sided USB connector of Wallet Flash™, available from Walletex Ltd., Rishon-Lezion, Israel, for connecting the digital memory card to a host computer.

Figure 1:
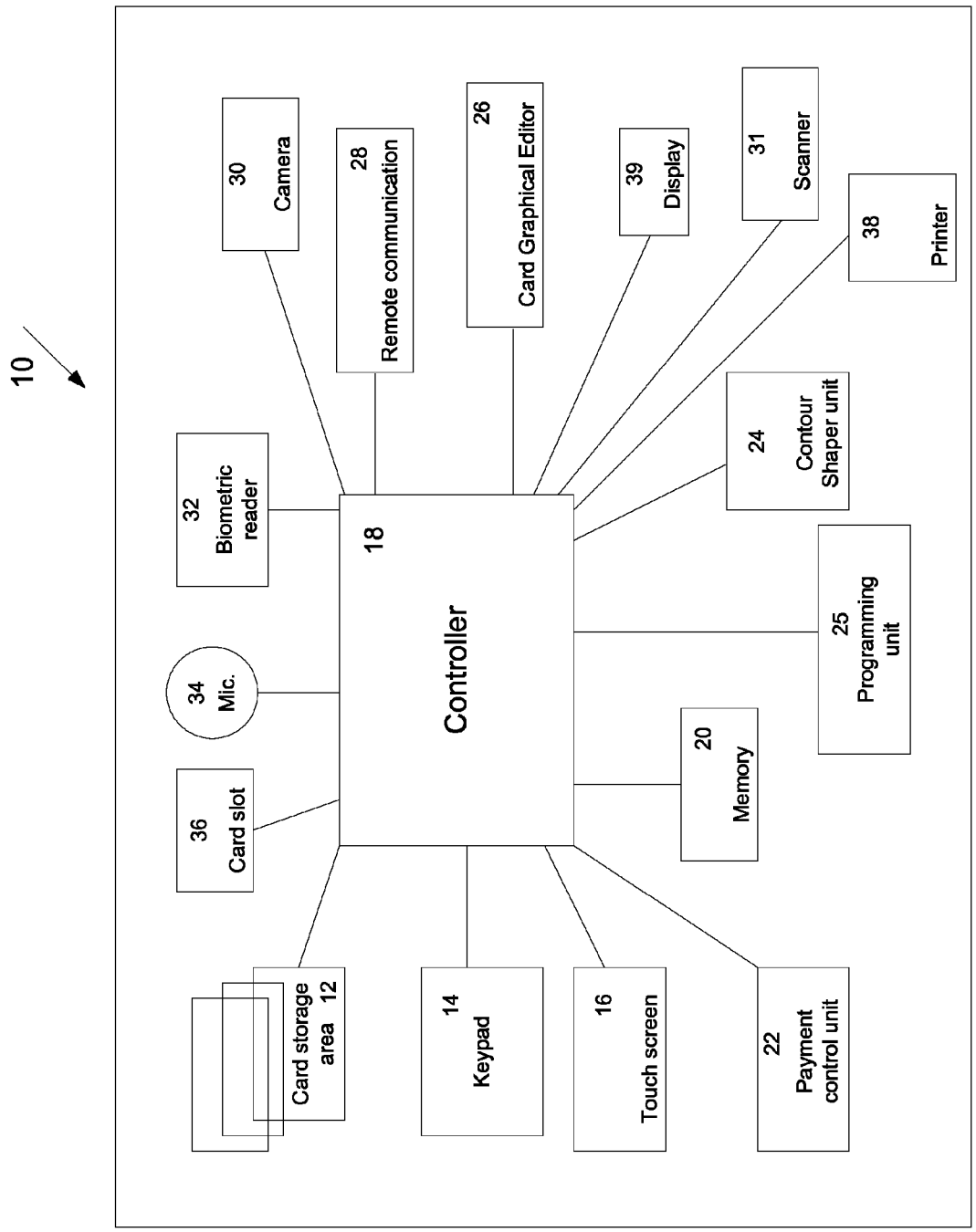
Referring to FIG. 1, there is shown an exemplifying, not limiting, high level schematic block diagram of a card vending device of the present invention; and Referring to FIG. 2, there is shown a simplified flow chart example of a method of the present invention for operating the card vending machine.

Referring now to FIG. 1, there is shown a block diagram of a card vending machine 10 of the present invention The digital memory cards are stored in special decks, one deck per issuer, in a card storage area 12. The digital memory cards can be fed into the machine either by the owner of the card vending machine, or alternatively by an authorized agent of each issuer.

As the card vending machine of the present invention is designed to serve several issuers, digital memory cards of one issuer are preferably stacked separately from digital memory cards of another issuer (e.g., in separate compartments 13) and access of issuers (or authorized agents thereof) to different parts of card storage area 12 is conditional upon authorization of the corresponding issuer. Preventing unauthorized people physical access to the storage area where memory cards of other issuers are stored can be achieved, for example, by stacking the memory cards in separate compartments 13. Each compartment has a respective lock to assure that only the authorized issuer can access the storage area of where his digital memory cards are stored to replace or extract the digital memory cards.

Optionally, a personal memory card can be fed (via a card slot 36) by its user to be customized by the card vending machine 10. This allows a user to insert his/her old digital memory card and load the digital memory card with more money, download new digital content, etc.

The digital memory card delivered by the machine to a user can be either a non-secure digital memory card or a secure digital memory card.

A secure card is provided to a user upon authentication of the user (using remote communication unit 28) by a remote source such as a human operator, in accordance with the specific requirements made by the different organizations for issuing their digital memory cards. Authentication of a user can be achieved, for example, by providing voice recognition means, such as a microphone 34, and/or providing facial recognition means, such as a camera 30, and/or implementing a scanner 31 to enable documentation presentation. The scanner further enables a user to scan his/her own graphical illustration (e.g., photo) and request that this graphical illustration be printed on the digital memory card that is to-be purchased from the card vending machine. Authentication can be further achieved using a biometric identifier reader 32 implemented in accordance with the biometric identification techniques (such as fingerprint recognition) well known in the art of information security. See, for example, the biometric system techniques and products, such as the 3dMDface™ System, available from 3dMD Ltd., Atlanta, Ga., that provides face recognition, descriptions of which are available on request from the American Biometric Consortium, all of which are incorporated by reference for all purposes as if fully set forth herein.

Card vending machine 10 also includes a Clipart library 20 storing graphical illustrations that are available to the user for incorporation upon the printed face of the digital memory cards, and a digital content storage unit 22 storing digital content, such as digital books, video films, audio songs, software applications, and other content, that is available for the user to download into the digital memory card. Note that the digital content is preferably stored in the digital content storage unit 22, in accordance with DRM (Digital Rights Management) methods providing copyright protection of the digital content and other information security methods known in the art A Controller 18 is operative to mange the overall customization and vending process of the card vending machine 10 in accordance with the requirements of the issuers and the preferences of the user that are received as input via a keypad 14 or a touch screen 16 for example. By way of example, the user's preferences may determine the way of which the digital memory card is to be produced in accordance with a plurality of aspects, such as the digital content to be downloaded (e.g., digital book, video films, audio songs, and software applications), the physical contour of the digital memory card, the graphical decoration (such as a personal printed decoration) of the digital memory card, the means of payment, etc.

The operational units include a Contour Shaper unit 24 for shaping the digital memory card, a Card Graphical Editor 26 for printing graphical decorations upon the digital memory card, and a Card Programming unit 25 for programming the digital memory card with requested digital content, all of which are applied in accordance with the preferences defined or selected by the user. Card Programming unit 25 is operative to store at least 200 bytes of user-dependent data in the digital memory card.

A display 39 is optionally provided for displaying the user a pre-view of the digital memory card before it is issued to the user.

A memory 20 storing graphical illustrations and digital content is also provided A user may choose to program and design his/her digital memory card according to digital content and graphical illustrations stored in memory 20, Alternatively, the digital content and graphical illustrations, which are required to be loaded into the digital memory card, may be downloaded (using USB connector 27) from the user's portable storage device, such as a Disk-On-Key™, available from msystems Ltd., Kefar Sava, Israel. A remote communication unit 28 is optionally provided for downloading the digital content and graphical illustrations from a remote storage device using wireless communication.

A payment unit 22, as found in many vending machines and parking machines known in the art, is operative to perform a purchasing transaction, typically by billing the user for the digital memory card/s and for the digital content that he/she purchased. A printer 38 is optionally implemented to provide the user with a receipt and other printed information that is related to the purchasing transaction. The payment unit 22 and printer 38 both operate in response to instructions received from Controller 18.

Figure 2:
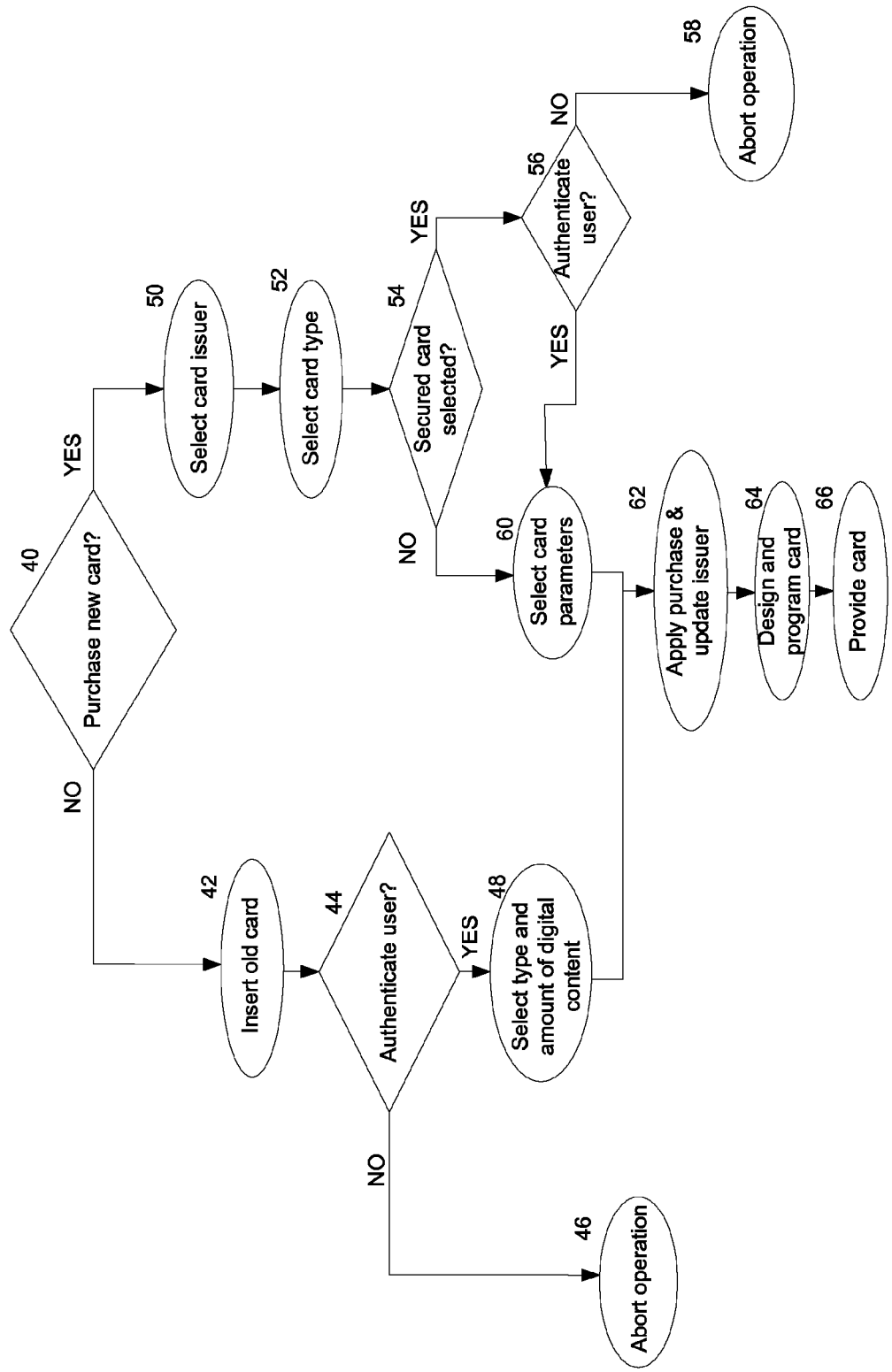

Referring to FIG. 2, there is shown a flowchart of a method of the present invention for operating the card vending machine.

At the initial step 40, the user is requested to select if he/she wishes to purchase a new digital memory card or to update an existing digital memory card.

If the user wishes to update his/her existing digital memory card, the user inserts his/her old digital memory card in card slot 36 (step 42). At the next step 44, it is determined whether the user is identified and authenticated by the card vending machine in accordance with the different authentication means known in the art, as presented above. If a unique issuer can not be identified as a valid issuer to serve this user, then operation is aborted (step 46). However, in case the user is identified and authorized by the card vending machine, step 48, then the user may select the type of transaction he/she wishes to perform (for example, downloading of new digital content, loading more money) for this digital memory card. The method then proceeds to step 60.

If the user wishes to purchase a new digital memory card, an issuer is selected by the user (step 50). A menu of operations specified by the selected issuer is then presented. At the next step 52, the user selects from the menu of operations the operations he wants to perform and the type of digital memory card he/she wishes to purchase.

At the next step 54, it is determined whether the selected operation involves a secure memory card. In the negative case, the method proceeds directly to step 60. However in the affirmative case, step 56, an authentication process is applied in accordance with the requirements defined by this issuer to authenticate the user. If the user is verified as authentic, the method then proceeds to step 60. If the user is not verified as authentic, the operation is aborted (step 58). The authentication process is applied in accordance with the different authentication means known in the art, as presented above.

At step 60, a set of parameters (such as physical shape, digital content, graphical illustrations) are defined by the user to determine the way in which the digital memory card is to be produced and the type and amount of digital content to be programmed into the digital memory card by the card vending machine. The digital content and graphical illustrations selected by the user can be downloaded either from a local memory of the card vending machine or from a remote storage device (such as a remote library of digital content owned by a publisher) physically separated and in remote communication with the card vending machine. Optionally, the user can select to design and program his/her digital memory card with digital content and graphical illustrations downloaded from his/her personal portable storage device.

At step 62, the purchasing transaction is applied by the user. At this step the issuer's database is updated with this purchasing transaction.

At step 64, the digital memory card is printed, shaped and programmed (using Contour Shape unit 24 and Card Graphical Editor 26) according to the set of parameters previously selected by the user at step 48 or at step 60.

At the final step 66, the digital memory card is provided to the user. This step may optionally include a process of quality control, by which the content of the digital memory card is being read or sampled and evaluated by the card vending machine.

Having described the system of the present invention with regard to certain specific embodiments thereof, it is to be understood that the description is not meant as a limitation, since further modifications will now suggest themselves to those skilled in the art, and it is intended to cover such modifications as fall within the scope of the appended claims.

What is claimed is:

1. A memory card comprising:
    a non-volatile memory;
    a connector configured to enable the memory card to be operatively coupled to a host computer; and
    a housing enclosing the non-volatile memory, the housing having a customized card shape that is determined according to a first user-selected shape parameter, wherein the housing is configured to be shaped by a contour shaper of a card vending machine to form the customized card shape, wherein the housing includes account information associated with the user and printed onto a surface of the housing, wherein the housing includes a user-selected customized graphical decoration that is determined according to a user-selected graphic value, the memory card dispensed from storage in a first storage compartment of the card vending machine, the first storage compartment accessible to a first issuer and excluded from access to a second issuer and distinct from a second storage compartment that is excluded from access to the first issuer and that is accessible to the second issuer, wherein the memory card is distinct from a second memory card from the second storage compartment that is shaped by the contour shaper and that includes second data stored in response to a second user-selected shape parameter.

2. The memory card of claim 1, wherein the second memory card is stored in the second storage compartment, wherein:
    first data associated with the first user-selected shape parameter is stored in the memory card via a card programming unit when a user is granted access to the memory card and in response to receipt of the first user-selected shape parameter;
    second data associated with the second user-selected shape parameter is stored in the second memory card via the card programming unit when the user is granted access to the second memory card and in response to receipt of the second user-selected shape parameter; and
    one of the memory card and the second memory card is provided to the user.

3. The memory card of claim 2, wherein the first user-selected shape parameter is associated with musical content.

4. The memory card of claim 2, wherein the first user-selected shape parameter is associated with a fungible asset.

5. The memory card of claim 2, wherein the first user-selected shape parameter is associated with downloadable digital content.

6. The memory card of claim 2, wherein the first data includes digital content.

7. The memory card of claim 6, wherein the digital content includes a software application.

8. The memory card of claim 2, wherein prior to providing the memory card to the user, the memory card is shaped according to a physical contour.

9. The memory card of claim 2, wherein prior to providing the memory card to the user, a user-selected graphic is applied to the memory card.

10. The memory card of claim 2, wherein the user is granted access to the memory card in response to the user satisfying at least one authentication criterion associated with the first issuer, and wherein the user is granted access to the second memory card in response to the user satisfying at least one authentication criterion associated with the second issuer.

11. The memory card of claim 2, wherein the first data includes user-selected data that is downloaded to the non-volatile memory in response to authorization by the first issuer.

12. The memory card of claim 2, wherein the one of the memory card and the second memory card is provided to the user in response to a user selection at the card vending machine.

13. The memory card of claim 2, wherein the first user-selected shape parameter specifies an amount of data to be stored in the memory card.

14. The memory card of claim 1, wherein the customized card shape corresponds to at least one of a driver license shape, a credit card shape, an employee badge shape, and a membership card shape.

15. A memory card comprising:
a non-volatile memory;
a connector configured to enable the memory card to be operatively coupled to a host computer; and
a housing enclosing the non-volatile memory, the housing having a customized card shape and further having a customized graphical decoration printed upon the housing, wherein the housing is configured to be shaped by a contour shaper of a card vending machine to form the customized card shape, and wherein the housing includes account information associated with the user and printed onto a surface of the housing,
wherein the memory card is a secure memory card and wherein the customized card shape and the customized graphical decoration correspond to selections of an authenticated user of the secure memory card to apply the customized card shape and the customized graphical decoration to the secure memory card, the memory card dispensed from storage in a first storage compartment of the card vending machine, the first storage compartment accessible to a first issuer and excluded from access to a second issuer and distinct from a second storage compartment that is excluded from access to the first issuer and that is accessible to the second issuer, wherein the memory card is distinct from a second memory card from the second storage compartment that is shaped by the contour shaper and that includes data stored in response to an authenticated user-selected value.

16. The memory card of claim 15, wherein the authenticated user is authenticated in response to satisfaction of at least one authentication criterion associated with the first issuer.

17. The memory card of claim 15, wherein the memory card has a first customized card shape corresponding to a first type of shape selected from a group consisting of: a driver license shape, a credit card shape, an employee badge shape, and a membership card shape, and wherein the second memory card has a second customized card shape corresponding to a second type of shape selected from a group consisting of: a driver license shape, a credit card shape, an employee badge shape, and a membership card shape.

18. The memory card of claim 15, wherein the data includes at least one of a digital book, video content, and audio content.

19. A method comprising:
in a first memory card having a non-volatile memory, a connector configured to enable the first memory card to be operatively coupled to a host computer, and a housing enclosing the non-volatile memory, the housing having a customized card shape that is determined according to a first card shape selection, wherein the housing is configured to be shaped by a contour shaper of a card vending machine to form the customized card shape, wherein the housing includes account information associated with the user and printed onto a surface of the housing, and wherein the housing includes a user-selected customized graphical decoration that is determined according to a user-selected graphic value, performing:
receiving data to be stored in the non-volatile memory, wherein the data corresponds to a data selection of the user; and
storing the data in the non-volatile memory,
wherein the first memory card is stored in a first storage compartment of the card vending machine, the first storage compartment accessible to a first issuer and excluded from access to a second issuer and distinct from a second storage compartment that is excluded from access to the first issuer and that is accessible to the second issuer, wherein the first memory card is distinct from a second memory card from the second storage compartment that is shaped by the contour shaper according to a second card shape selection.

20. The method of claim 19, wherein the data includes digital content.

21. The method of claim 20, wherein the digital content includes at least one of a digital book, video content, and audio content.

22. The method of claim 20, wherein the digital content and the customized card shape are received from the card vending machine.

23. The method of claim 19, wherein the data includes at least one of a digital book, video content, and audio content.

24. The method of claim 19, wherein the customized card shape corresponds to at least one of a driver license shape, a credit card shape, an employee badge shape, and a membership card shape.

* * * * *